(12) United States Patent
Young, Jr. et al.

(10) Patent No.: US 6,554,728 B2
(45) Date of Patent: Apr. 29, 2003

(54) FASTENERLESS CHAIN SNUBBER

(75) Inventors: Roger G. Young, Jr., Lansing, NY (US); Roger P. Butterfield, Trumansburg, NY (US); D. Laurence Parks, Waverly, NY (US)

(73) Assignee: BorgWarner, Inc., Troy, MI (US)

( * ) Notice: Subject to any disclaimer, the term of this patent is extended or adjusted under 35 U.S.C. 154(b) by 0 days.

(21) Appl. No.: 09/966,854

(22) Filed: Sep. 28, 2001

(65) Prior Publication Data

US 2002/0042316 A1 Apr. 11, 2002

Related U.S. Application Data

(60) Provisional application No. 60/238,201, filed on Oct. 5, 2000.

(51) Int. Cl.⁷ .................................................. F16H 7/18
(52) U.S. Cl. ..................................................... 474/140
(58) Field of Search ............................. 474/100, 101, 474/111, 140, 144, 147, 148, 149, 150

(56) References Cited

U.S. PATENT DOCUMENTS

| | | | | |
|---|---|---|---|---|
| 2,526,173 A | * | 10/1950 | Thomassin | 474/140 |
| 2,601,789 A | * | 7/1952 | Riopelle | 474/140 |
| 2,766,634 A | * | 10/1956 | Frank | 474/140 |
| 4,193,314 A | | 3/1980 | Horner et al. | 74/242.5 |
| 4,638,935 A | * | 1/1987 | Wald | 226/171 |
| 4,726,801 A | * | 2/1988 | Stark | 474/101 |
| 4,879,977 A | * | 11/1989 | Restelli | 123/90.31 |
| 5,045,032 A | * | 9/1991 | Suzuki et al. | 474/140 |
| 5,049,114 A | * | 9/1991 | Hayden | 474/111 |
| 5,176,582 A | * | 1/1993 | Chang et al. | 74/140 |
| 5,425,680 A | * | 6/1995 | Young | 474/111 |
| 5,628,701 A | * | 5/1997 | Dembosky et al. | 474/101 |
| 5,665,019 A | * | 9/1997 | Sheffer et al. | 474/111 |
| 5,676,614 A | * | 10/1997 | Inoue et al. | 474/110 |
| 5,779,582 A | * | 7/1998 | Mott et al. | 474/140 |
| 5,813,935 A | * | 9/1998 | Dembosky et al. | 474/111 |
| 5,885,179 A | * | 3/1999 | Lewis et al. | 474/110 |
| 5,951,423 A | * | 9/1999 | Simpson | 474/109 |
| 5,989,138 A | * | 11/1999 | Capucci | 474/109 |
| 6,093,123 A | * | 7/2000 | Baddaria et al. | 474/101 |
| 6,322,471 B1 | * | 11/2001 | Hashimoto | 474/140 |

\* cited by examiner

*Primary Examiner*—David A. Bucci
*Assistant Examiner*—Vicky A. Johnson
(74) *Attorney, Agent, or Firm*—McAndrews, Held & Malloy; Greg Dziegielweski

(57) ABSTRACT

A fastenerless chain snubber is provided that consists of a snubber body, and one or more attachment arms that form positioning blocks. The snubber is positioned in a housing by channel surfaces in the chain housing that locate the positioning blocks of the snubber. The snubber is firmly secured during chain operation by the substantial contact between the snubber attachment arm surfaces opposite the chain cover and the corresponding surface of the installed chain cover.

6 Claims, 5 Drawing Sheets

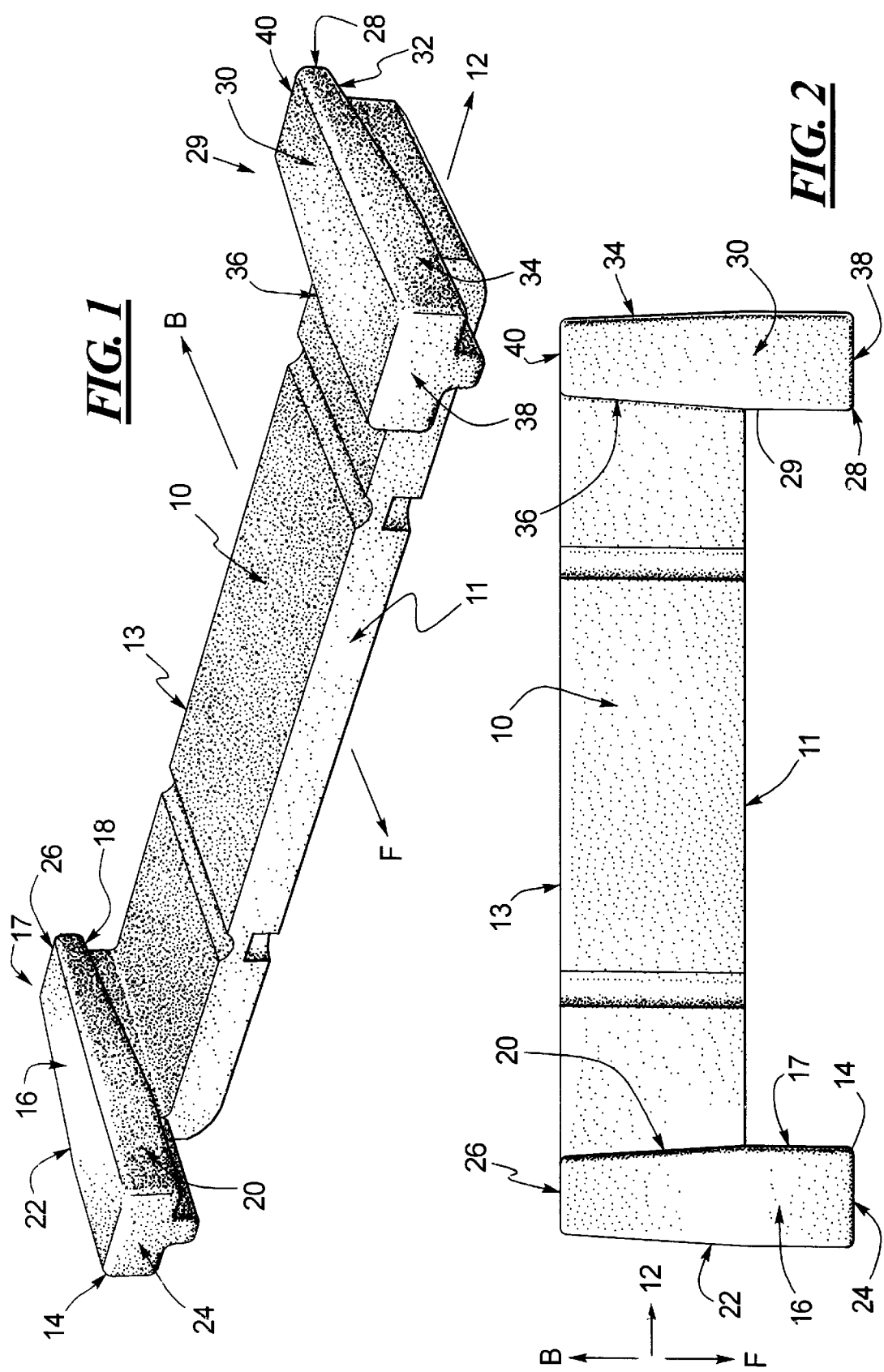

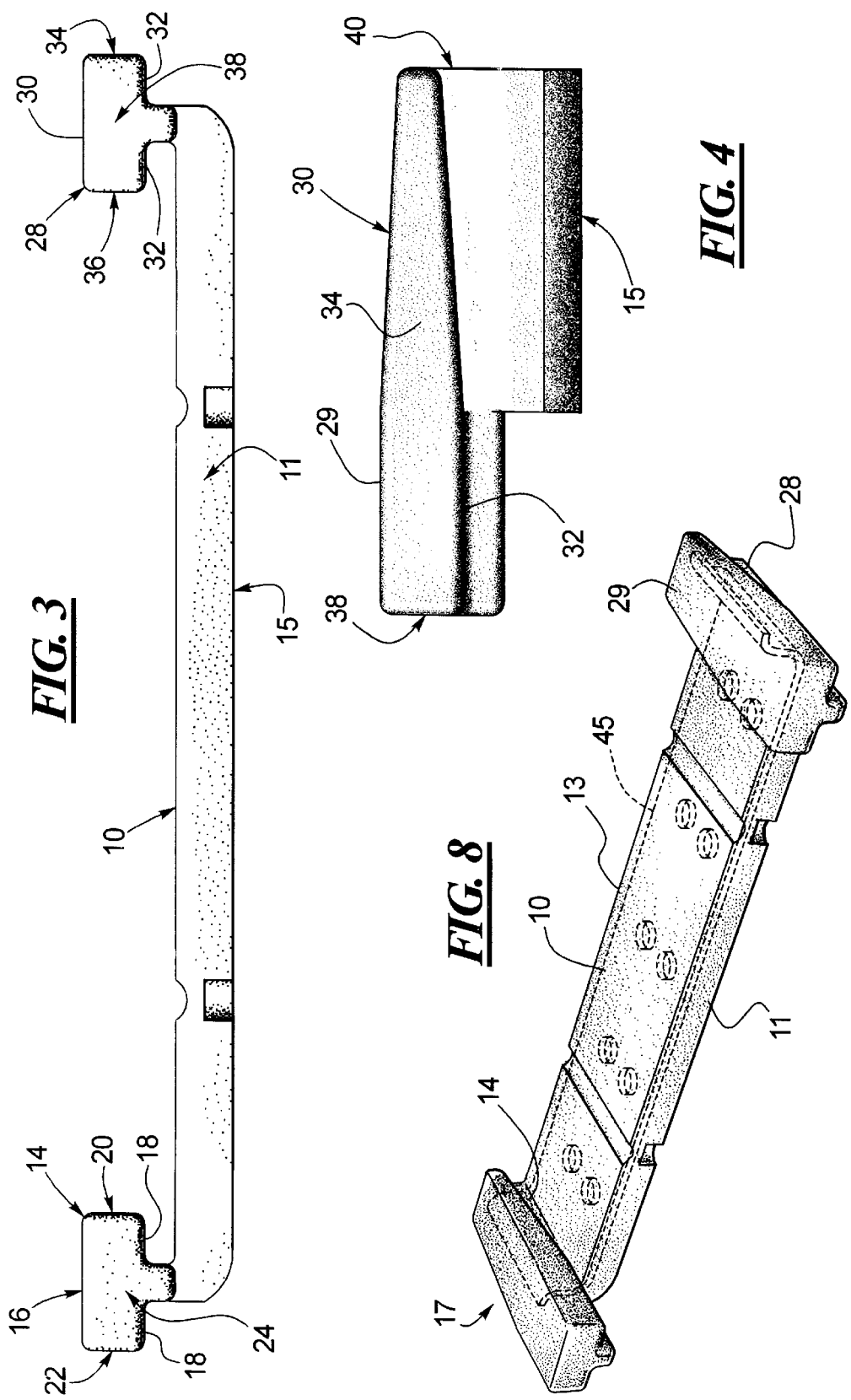

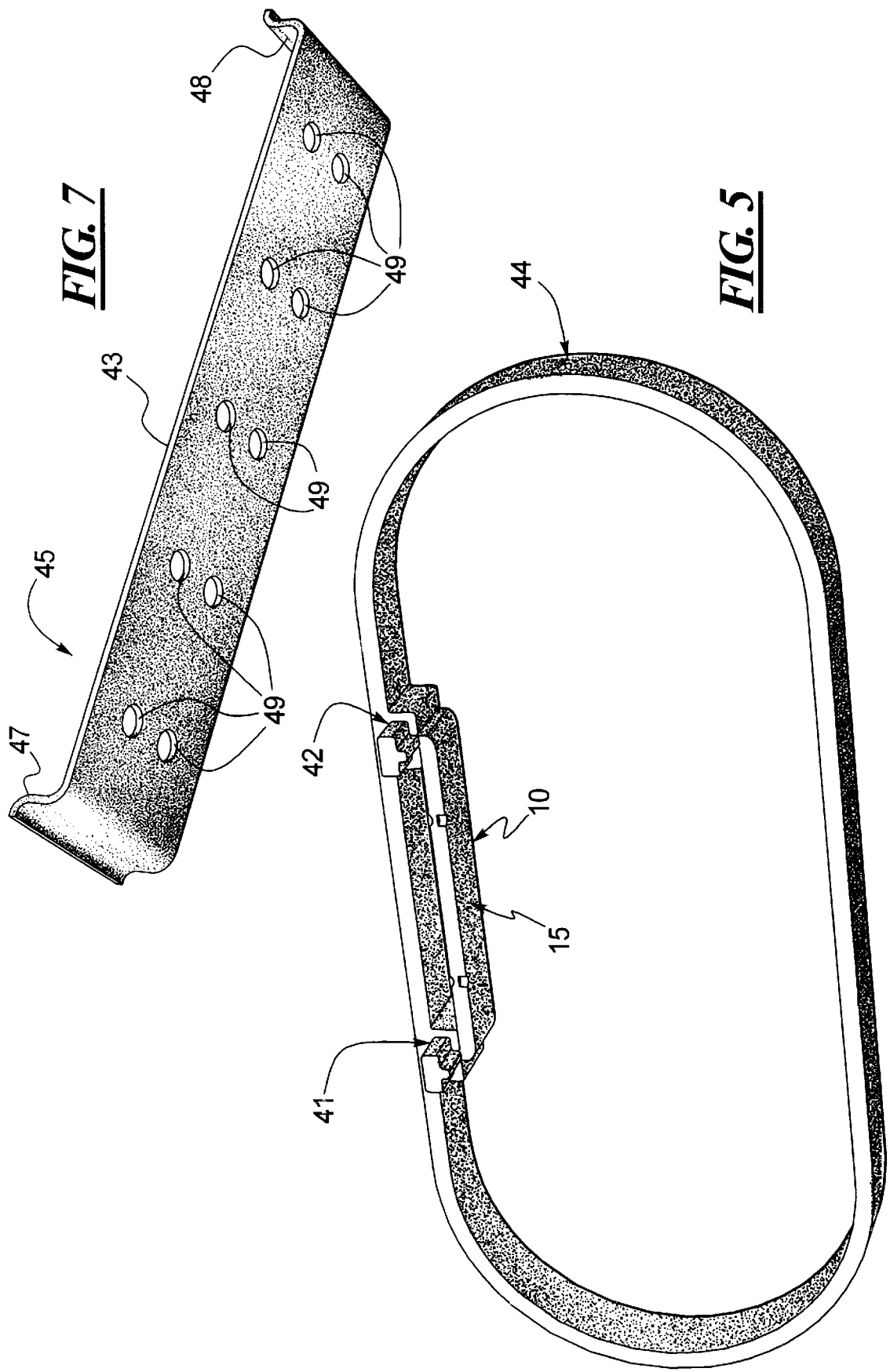

FASTENERLESS CHAIN SNUBBER

CROSS-REFERENCE TO RELATED APPLICATIONS

Priority is claimed from provisional application U.S. Ser. No. 60/238,201, filed Oct. 5, 2000 now pending. The entire specification of the provisional application is hereby incorporated by reference.

STATEMENT REGARDING FEDERALLY SPONSORED RESEARCH OR DEVELOPMENT

Not applicable.

BACKGROUND OF THE INVENTION

The present invention relates generally to a chain snubber for a power transmission chain such as an engine timing chain, transmission drive chain, or four-wheel drive transfer case chain. In particular, the present invention relates to a chain snubber that is positioned in and secured to a chain housing without the use of fasteners. Instead of fasteners, the snubber is positioned and secured by contact with the chain housing.

Power transmission chains are used in many automotive applications. For example, engine timing chains engage a sprocket on the crankshaft and a sprocket on a camshaft to drive the camshaft. Another important application is a four-wheel drive transfer case in which a power transmission chain engages and is driven by a drive sprocket and also engages and drives an output or driven sprocket. In these applications, it is often desirable to prevent or limit chain vibration and movement of the free span of chain between the sprockets. Tensioning devices or snubbers are conventionally used for these purposes. A snubber adjacent to a chain may be used to limit chain movement and vibration by contact with the chain.

Typically, chain snubbers are positioned and secured to a chain housing using fasteners. An example of a timing chain snubber using fasteners is shown in U.S. Pat. No. 4,193,314. This snubber includes a pair of guide shoes that are secured to a sheet metal snubber body. The snubber body is formed to be positioned against the engine block and defines holes through which fasteners secure the snubber body to the engine block. The guide shoes extend along chain runs between sprockets. The guide shoes prevent movement of the chain and limit chain oscillation or vibration.

The use of conventional fasteners, for example screws or bolts, to position and secure a snubber or guide to the chain housing is effective, but requires time for assembly and adds expense to chain systems. Thus, there has been a long-felt need in the automotive industry for a chain snubber that can be quickly positioned and secured economically, i.e. without the use of fasteners.

One attempt to position and secure a chain guide without the use of fasteners is understood to have been used commercially in the Oldsmobile Quad 4 engine. This chain guide was made from hard plastic and included separated mounting arms that were sized to fit loosely within slots in the chain housing. The slots were separated by a distance that required the mounting arms to be deflected away from each other to be positioned in the slots. The chain guide was held in place by a spring-like tension of the mounting arms towards each other and against surfaces of the slots in the housing. This chain guide limited chain vibration and movement. The flexibility and relatively loose fit of the mounting arms within the housing slots however permitted some movement of the guide due to contact with the moving chain. This movement of the guide and contact of the chain with the hard plastic surface of the guide generated undesirable levels of noise.

Flexibility of a chain snubber is also a concern, particularly where the snubber is relatively long, where the drive chain is heavy, or the snubber otherwise may deflect unacceptably. A chain snubber may be secured with additional fasteners to additionally support the snubber, or may be supported by a metal body that is secured by fasteners as shown by U.S. Pat. No. 4,193,314. Supporting a snubber by these methods also increases the cost of the chain assembly.

Automotive chain drives are subject to particularly stringent noise requirements. The noise created by prior guides having fastenerless mountings, such as the Quad 4 chain guide, was a significant disadvantage as compared to conventionally secured guides of earlier and later designs. A long felt need remains for a fastenerless chain snubber capable of limiting chain movement and vibration without producing objectionable levels of noise during chain movement.

BRIEF SUMMARY OF THE INVENTION

It is an object of the present invention to reduce the assembly time and costs of a power transmission chain by eliminating the use of fasteners to position and secure a chain snubber adjacent to the chain. It is also an object of the present invention to provide a snubber that limits the movement and vibration of a chain while avoiding objectionable chain system noise levels.

The present invention positions and secures a chain snubber with respect to a chain housing without the use of fasteners. The chain contact surface of the snubber may be an elastomer to prevent unacceptable noise levels due to chain contact with the snubber during operation.

A fastenerless chain snubber is provided that includes a snubber body and one or more attachment arms. The snubber is positioned by contact of the attachment arms against openings of a chain housing to retain, or trap contacting surfaces of the attachment arms of the snubber. The attachment arms of the snubber may be molded or cut into various geometries, including a tapered shape. The housing openings that contact the arms may be grooves, holes, or slots that are formed or cut into the chain housing to contact the attachment arms to secure the snubber to the housing. The geometry of the arms and the housing results in contact between the surface of the attachment arm and the surface of the housing opening that prevents movement of the attachment arm with respect to the housing.

Attachment arms having tapered attachment geometry is portrayed in the drawings, but other shapes of the arm or housing opening that trap the attachment arm within the housing opening are also contemplated. For example, a conical shape is contemplated that would provide a continuous surface for positioning.

The snubber can be firmly secured during chain operation by substantial contact between the snubber attachment arms and a chain cover. The arms may be contacted by one or more housing covers that secure the arms within housing openings. Contact of the arms against a cover limits the movement of the snubber and may additionally secure the snubber to the housing by urging the attachment arms against the housing openings. Compression of the attachment arms is only required to create substantial contact with the chain cover. The attachment arms need not be significantly deformed by the installation of the chain cover(s).

Compression that increases the amount of contact, the force of contact, or both between the attachment arm and the housing opening is contemplated with allowance for the elasticity of the attachment arm material. For example, the opening in the chain housing may or may not extend completely through the chain housing. If the openings do not extend completely through the housing, or the attachment arms engage the housing so as to extend beyond the chain housing on one side of the housing, the attachment arm can contact one cover and the opening of the housing. However, if the openings do extend through the housing and the attachment arms extend beyond the chain housing on opposed sides of the housing, the snubber can be secured by substantial contact with a chain cover on each side of the housing.

A snubber according to the present invention may also include a reinforcement that strengthens the snubber adjacent to a chain to limit snubber deflection. Use of such a reinforcement is particularly advantageous where the snubber body extends a relatively long distance between mounting arms, where the chain adjacent to the snubber body is particularly heavy, or both. A power transmission chain in a four-wheel drive transfer case is one such contemplated application of such a reinforcement.

BRIEF DESCRIPTION OF THE DRAWINGS

FIG. 1 shows a perspective view of the presently preferred embodiment of the snubber of the present invention.

FIG. 2 is a top view of the snubber shown by FIG. 1.

FIG. 3 is a front view of the snubber shown by FIG. 1.

FIG. 4 is a side view of the snubber shown by FIG. 1.

FIG. 5 is a perspective view of the snubber shown by FIG. 1 positioned in a housing.

FIG. 7 is an oblique view of a reinforcement for the snubber shown by FIG. 1.

FIG. 8 is an oblique view of the reinforcement shown by FIG. 7 molded within the snubber shown by FIG. 1.

DETAILED DESCRIPTION OF THE INVENTION

Figure 6:
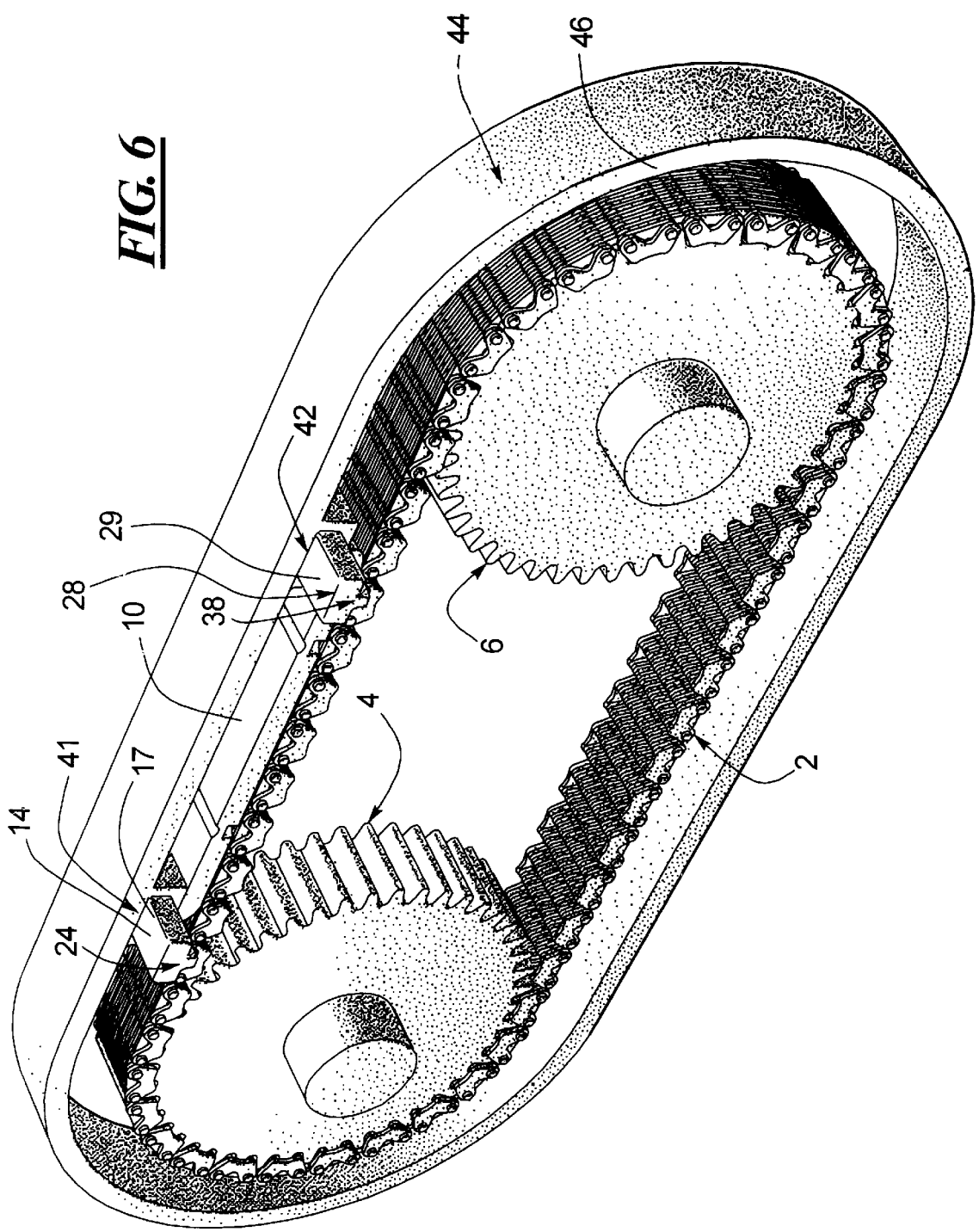
FIG. 6 is a perspective view of the snubber shown by FIG. 1 positioned in a housing and adjacent to a chain.

Turning now to the drawings, FIGS. 1–4 depict the presently preferred embodiment of the fastenerless chain snubber. A snubber body 10 is generally elongate along a chain direction 12. The snubber 10 defines a generally flat chain surface 15 for contacting the chain and limiting chain movement and vibration. The snubber body 10 may be entirely elastomer or may be elastomer bonded to a reinforcing material such as aluminum, steel, or nylon. Other reinforcing materials known in the art may be used as well.

As best shown by FIGS. 1 and 2, the snubber body 10 extends along the chain direction 12 and defines a front edge 11 and a back edge 13 that define the furthest extents of the snubber body 10 along a front direction F and a back direction B, respectively, that are perpendicular to the chain direction 12 and opposite to each other. The chain surface 15 extends from the front edge 11 to the back edge 13 and along the chain direction 12.

Two attachment arms, 14 and 28, are located at separated locations along the chain direction 12 and near opposite ends of the snubber body 10. The attachment arms 14 and 28 are configured to secure the snubber body 10 to a chain housing, e.g. engine block, transmission, or transfer case as shown by FIG. 5. As best shown by FIGS. 1, 3, and 4, the attachment arms 14 and 28 extend from the snubber body 10 oppositely from the surface 15. As shown by FIGS. 2 and 4, the attachment arms 14 and 28 each define a wedge-shaped positioning block, 17 and 29 respectively. The positioning blocks 17 and 29 extend generally along the front and back directions. The positioning blocks 17 and 29 position the snubber body 10 in a chain housing by engaging the housing as described below.

The positioning blocks 17 and 29 define front surfaces 24 and 38, respectively, at their furthest extent in the front direction F, and define back surfaces 26 and 40, respectively, at their furthest extent in the back direction B. Positioning blocks 17 and 29 define top surfaces 16 and 30, respectively, that are generally flat and face oppositely from the chain surface 15 as best shown by FIGS. 1 and 3. The top surfaces 16 and 30 define the furthest extent of the arms 14 and 28, respectively, from the chain surface 15 and extend from the front surfaces 24 and 38 to the back surfaces 26 and 40, respectively. The positioning blocks 17 and 29 define bottom surfaces 18 and 32, respectively, that are separated from and face generally away from the top surfaces 16 and 30. As shown by FIGS. 1 and 4, the bottom surfaces 18 and 32 converge toward the top surfaces, 16 and 30, respectively, along the direction from the front surfaces 24 and 38 to the back surfaces 26 and 40. The top and bottom surfaces 16 and 18 of the positioning block 17 and the top and bottom surfaces 30 and 32 of the positioning block 29 form wedges that are narrower at the back surfaces 26 and 40 and wider at the front surfaces 24 and 38.

The positioning blocks 17 and 29 define right side surfaces 20 and 34, respectively, that extend from the top surfaces 16 and 30 to the bottom surfaces 18 and 32, respectively, at the farthest extent of the positioning blocks 17 and 29 in first direction along the chain direction 12. The positioning blocks 17 and 29 form left side surfaces 22 and 36 that extend from the top surfaces 16 and 30 to the bottom surfaces 18 and 32 at the farthest extent of the positioning blocks 17 and 29 along a second direction along the chain direction 12 that is opposite the first direction. The right side surfaces 20 and 34 face generally opposite from the left side surfaces 22 and 36.

The right side surfaces 20 and 34 and the left side surfaces 22 and 36 of the positioning blocks 17 and 29 converge toward each other along the direction from the front surfaces 24 and 38 toward the rear surfaces 26 and 40. The positioning blocks 17 and 29 are wedge shaped along the front and back directions F and B due to the converging of right side surfaces 20 and 34 and the left side surfaces 22 and 36. The right and left surfaces 20 and 22 of the positioning block 17 and the right and left surfaces 34 and 36 of the positioning block 29 form wedges that are smaller at the back surfaces 26 and 40 and at the front surfaces 24 and 38.

As shown by FIG. 5 the positioning blocks 17 and 29 of the attachment arms 14 and 28, respectively, are generally elongate and extend along the front direction F beyond the front edge 11 of the snubber body 10 to cause a chain cover (not shown) to contact with the front surfaces 24, 38 of the attachment arms 14 and 28. The rear surfaces 26, 40 do not extend beyond the rear edge 13 of the snubber body 10.

FIG. 6 depicts a front view of the snubber body 10 positioned adjacent to a chain 2 along a run between sprockets 4 and 6. A chain housing 44 surrounds the chain 2 and defines a cover surface 46 against which a chain cover, not shown, is secured by conventional means to enclose the chain 2 and sprockets 4 and 6. The snubber body 10 is positioned engaging the chain housing 44 by the positioning blocks 17 and 29 of the attachment arms 14, 28, respectively, being received by attachment channels 41 and 42, respectively, that are formed by the chain housing 44 and that open at the cover surface 46. The channels 41 and 42 are formed to accept the positioning blocks 17 and 29 adjacent to the back surfaces 26 and 40, and to allow the positioning blocks 17 and 29 to be inserted into the channels 41 and 42 starting at the back surfaces 26 and 40. The channels 41 and 42 are smaller than the positioning blocks 17 and 29 adjacent to the front surfaces 24 and 38.

As shown by FIGS. 5 and 6 the positioning blocks 17 and 29 are prevented from completely entering the channels 41 and 42 leaving a portion of the positioning blocks 17 and 29 adjacent the front surfaces 24 and 38 extending beyond the cover surface 46. When a chain cover (not shown) is installed adjacent to the cover surface 46 of the housing 44, the cover will come into contact with the protruding front surfaces 24, 38 of the attachment arms 14, 28. The chain cover compresses the positioning blocks 17 and 29 into the channels 41 and 42 to hold the snubber body 10 firmly in place in the housing 44.

FIG. 7 shows a reinforcement 45 for the snubber body 10. The reinforcement 45 is preferably formed by a steel plate. The reinforcement 45 includes an elongate central section 43. The central section 43 is sized to be within the snubber body 10 adjacent to the chain surface 15. As best shown by FIG. 8, the central section 43 extends substantially from the front edge 11 to the back edge 13 of the snubber body 10, and from the attachment arm 14 to the attachment arm 28. The reinforcement 45 forms tabs 47 and 48 at opposed ends of the central section 43. The tabs 47 and 48 are separated by distance that permits the tab 47 to be positioned within the attachment arm 14 and the tab 48 to be positioned within the attachment arm 28.

As shown by FIGS. 7 and 8, the reinforcement 45 defines a plurality of holes 49 within the central section 43. The snubber body 10 formed by elastomer that is insert molded around the reinforcement 45. The elastomer surrounds the reinforcement 45, including within the holes 49, to conform to and engage the reinforcement 45.

Figure 9:
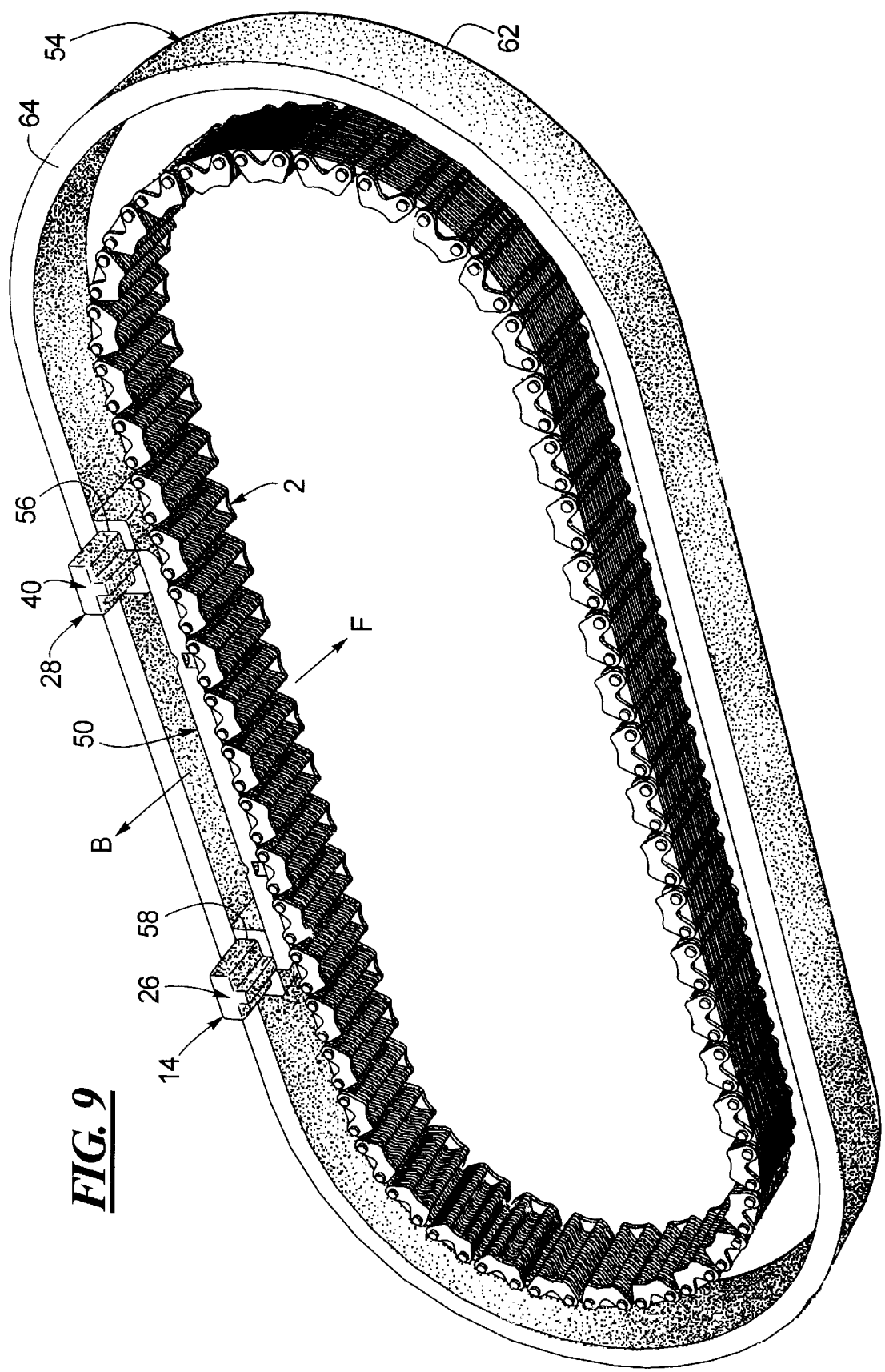
FIG. 9 is a perspective view of a housing and snubber according to the present invention.

FIG. 9 shows another embodiment of the invention. The chain 2 is located in a housing 54. A snubber body 50 is mounted to the housing 54. In this embodiment, the housing 54 surrounds the chain 2 and defines two cover surfaces, a cover surface 62 facing generally along the front direction F, and a cover surface 64 facing along the back direction B. Channels 56 and 58 extend through the housing 54 along the F and B directions. Attachment arms 14, 28 of the snubber body 50 extend beyond the front and rear edges of the snubber body 50 such that the rear surfaces 26, 40 of the attachment arms 14, 28 extend beyond the cover surface 64 and the front surfaces 24 and 38 extend beyond the cover surface 62 as described above by reference to the embodiment shown by FIG. 6. In this manner, two chain covers, one positioned adjacent to the cover surface 62 and one adjacent to the cover surface 64 firmly secure the snubber body 50 in the housing 54.

While the invention has been described with reference to several preferred embodiments, those skilled in the art will understand that various changes may be made and equivalents may be substituted without departing from the scope of the invention. In addition, many modifications may be made to adapt a particular step, structure, or material to the teachings of the invention without departing from its scope. In particular, it should be noted that the number and shape of the attachment arms and of those having openings in which the attachment arms are positioned may be varied by those skilled in the art to result in more configurations of the disclosed invention. Therefore, it is intended that the invention not be limited to the particular embodiments disclosed, but that the invention will include all embodiments falling within the scope of the appended claims.

What is claimed is:

1. A fastenerless chain snubber and housing assembly comprising:

a chain snubber, the chain snubber defining an attachment arm, the attachment arm including an elongate positioning block having two generally oppositely facing surfaces defining a wedge extending from a narrow end to a wide end, a housing, the housing defining a cover surface and an attachment channel extending into the housing from the cover surface, the attachment channel configured to receive the narrow end of the positioning block and to contact the oppositely facing surfaces of the positioning block adjacent to the narrow end within the channel, and to position a portion of the positioning block adjacent to the wide end outside the channel adjacent to the cover surface and outside the housing.

2. The fastenerless chain snubber and housing assembly of claim 1 wherein the oppositely facing surfaces of the positioning block are generally flat.

3. The fastenerless chain snubber and housing assembly of claim 1 wherein the chain snubber defines a second attachment arm that is separated from the attachment arm along a chain direction, the second attachment arm including an elongate positioning block having two generally oppositely facing surfaces defining a wedge extending from a narrow end to a wide end, and the housing defining a second attachment channel extending into the housing from the cover surface, the second attachment channel located and configured to receive the narrow end of the second positioning block and to contact the oppositely facing surfaces of the second positioning block adjacent to the narrow end of the second positioning block within the channel.

4. The fastenerless chain snubber and housing assembly of claim 3 wherein the chain snubber forms a chain contact surface between the attachment arm and the second attachment arm, the chain contact surface facing away from the attachment arms.

5. The fastenerless chain snubber and housing assembly of claim 4 wherein the chain snubber includes a reinforcement within the chain snubber adjacent to the chain contact surface.

6. The fastenerless chain snubber and housing assembly of claim 5 wherein the reinforcement extends into the attachment arms.

* * * * *